United States Patent
Hu et al.

(10) Patent No.: US 8,675,534 B2
(45) Date of Patent: Mar. 18, 2014

(54) METHOD AND SYSTEM FOR REALIZING CARRIER CONTROL

(75) Inventors: Haiying Hu, Shenzhen (CN); Qiang Qian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 403 days.

(21) Appl. No.: 13/259,054

(22) PCT Filed: Apr. 27, 2010

(86) PCT No.: PCT/CN2010/072259
§ 371 (c)(1),
(2), (4) Date: Sep. 22, 2011

(87) PCT Pub. No.: WO2010/145336
PCT Pub. Date: Dec. 23, 2010

(65) Prior Publication Data
US 2012/0275363 A1    Nov. 1, 2012

(30) Foreign Application Priority Data
Oct. 23, 2009  (CN) .......................... 2009 1 0236510

(51) Int. Cl.
*H04W 52/02*    (2009.01)

(52) U.S. Cl.
USPC .......................................................... 370/311

(58) Field of Classification Search
USPC ................. 370/310–312, 319, 329, 335, 341
See application file for complete search history.

(56) References Cited

U.S. PATENT DOCUMENTS

| | | | |
|---|---|---|---|
| 6,584,330 B1 | 6/2003 | Ruuska | |
| 6,654,363 B1 * | 11/2003 | Li et al. ......................... | 370/338 |
| 2007/0177552 A1 | 8/2007 | Wu et al. | |
| 2011/0158332 A1 | 6/2011 | Wu et al. | |

FOREIGN PATENT DOCUMENTS

| | | |
|---|---|---|
| CN | 101394658 A | 3/2009 |
| CN | 101420741 A | 4/2009 |
| CN | 101426264 A | 5/2009 |
| EP | 1713290 A1 | 10/2006 |
| EP | 2197221 A1 | 6/2010 |
| WO | 2009036636 A1 | 3/2009 |

OTHER PUBLICATIONS

International Search Report in international application No. PCT/CN2010/072259, mailed on Aug. 5, 2010.
English Translation of the Written Opinion of the International Search Authority in international application No. PCT/CN2010/072259, mailed on Aug. 5, 2010.
Supplementary European Search Report in European application No. 10788732.5, mailed on Jan. 30, 2013.

* cited by examiner

*Primary Examiner* — Kwang B Yao
*Assistant Examiner* — Syed M Bokhari
(74) *Attorney, Agent, or Firm* — Oppedahl Patent Law Firm LLC

(57) ABSTRACT

The present disclosure provides a method and system for realizing a carrier control. The method includes: a BBU obtains and collects on-off state information of corresponding logic carriers of all configured cells and logic physical relationships of carrier frequencies according to on-off states of physical carriers reported by RRUs and reports them to a Base Station Controller (BSC); the BSC re-determines the on-off states of the logic carriers and returns them to the BBU; and the BBU converts the obtained on-off states of the logic carriers into on-off states of the physical carriers and transmits them to corresponding RRUs, and the RRUs perform carrier controls according to the obtained on-off states of the physical carriers. By the method of the present disclosure, the BSC ensures itself to be consistent with the on-off states of the carriers of the RRU by effectively controlling the on-off states of the RRU through the BBU, so that carriers are well controlled and the target of saving energy and reducing consumption is better achieved.

18 Claims, 4 Drawing Sheets

METHOD AND SYSTEM FOR REALIZING CARRIER CONTROL

TECHNICAL FIELD

The present disclosure relates to a Software Defined Radio (SDR) base station technology, in particular to a method and system for realizing a carrier control in an SDR base station consisting of a Base Band Unit (BBU) and a Radio Remote Unit (RRU).

BACKGROUND

In order to reduce the operating cost, at the wireless side of a $2^{nd}$ or $3^{rd}$ generation mobile communication system, a Base Station Controller (BSC) controls some logic carrier frequencies to be powered off according to cell performance measurement data when a service is idle, and controls these logic carrier frequencies to be powered on when the service is busy or a cell Broadcast Control Channel (BCCH) is switched.

At present, in a commercial BBU+RRU SDR base station, the BBU and RRU are independent from each other to transmit a cable connection. The baseband pool resources of the BBU are public, and will be bound to a logic carrier frequency only when there is a service. When the service is idle, a carrier frequency is powered off by a certain physical carrier on the RRU corresponding to the logic carrier frequency to realize a carrier control. For a single-carrier RRU, a carrier can be powered off by turning off a power amplifier corresponding to the carrier; and for a multicarrier RRU, if all the carriers of the RRU require to be powered off, the power amplifier can be turned off, and when not all the carriers require to be powered off, the aim of saving energy and reducing consumption can be achieved by turning off the powers of corresponding carriers and reducing the total powers and the power amplifier bias voltage.

It can be seen from the above-mentioned existing method for realizing a carrier control that, the operation object of a BSC is a logic carrier frequency, while a binding relationship between a logic carrier frequency of an SDR base station and a physical carrier of a RRU is determined by a proximal operation maintenance network management configuration, this configuration is sent to the BBU and is transparent to the BSC. Only physical carriers are operable objects of the RRU, but the RRU does not know which logic carrier frequency each of its own physical carriers corresponds to.

That is to say, when the logic physical configuration of a carrier frequency is changed, or the state of the RRU per se is changed (such as being restored), there exists a situation that the BSC cannot act in line with the on-off states of carriers of the RRU, therefore the carrier cannot be well controlled and thereby the aim of saving energy and reducing consumption can not be well achieved.

SUMMARY

In view of the above, the main target of the present disclosure is to provide a method for realizing a carrier control, which can ensure that a Base Station Controller (BSC) and carrier on-off states of a RRU keep consistent, and well achieves the aim of saving energy and reducing consumption.

Another target of the present disclosure is to provide a system for realizing a carrier control, which can ensure that a BSC and carrier on-off states of a RRU keep consistent, and well achieves the aim of saving energy and reducing consumption.

In order to achieve the above-mentioned targets, the technical solution of the present disclosure is implemented as follows.

A method for realizing a carrier control includes:

Radio Remote Units (RRU) report on-off states of physical carriers to a Base Band Processing Unit (BBU);

the BBU obtains and collects on-off state information of corresponding logic carriers of all the configured cells according to the on-off states of the physical carriers reported by the RRUs and logic physical relationships of carrier frequencies, and reports the on-off state information to a Base Station Controller (BSC);

the BSC re-determines the on-off states of the logic carriers and returns them to the BBU according to the obtained on-off states of the current logic carriers and the logic physical relationships of the carrier frequencies; and the BBU converts the obtained on-off states of the logic carriers into on-off states of the physical carriers and sends them to corresponding RRUs, and the RRUs perform carrier controls according to the obtained on-off states of the physical carriers.

when a preset first timer times out, the RRUs regularly report the on-off states of the physical carriers to the BBU; and when a preset second timer times out, the BBU regularly reports the on-off state information of the logic carriers and the logic physical relationships of the carrier frequencies to the BSC.

After the RRUs regularly report the on-off states of the physical carriers to the BBU, the method may further include:

after receiving on-off states of physical carriers of a certain RRU, the BBU compares the received on-off states with on-off states of the physical carriers stored by the BBU per se and recorded in an on-off state table of carriers of the RRU, and returns the on-off states of the physical carriers of the RRU stored by the BBU per se to the RRU if the received on-off states and the stored on-off states are different; and the RRUs perform on-off reconfiguration on the carriers according to the on-off states of the physical carriers returned by the BBU.

The step that the BBU obtains and collects on-off state information of corresponding logic carriers of all the configured cells may include:

the BBU searches for logic carrier frequencies corresponding to the physical carrier frequencies reported by the RRUs according to the on-off states of the physical carriers reported by the RRUs and the logic physical relationships of the carrier frequencies issued by a network manager, and collects the on-off state information of the corresponding logic carriers of all the configured cells.

The BBU may further transmit the logic physical relationships of the carrier frequencies issued by the network manager to the BSC; and the step that the BSC re-determines on-off states of the logic carriers may include:

the BSC obtains on-off states of physical carrier frequencies of each RRU according to the obtained on-off states of the current logic carriers and the logic physical relationships of the carrier frequencies transmitted from the BBU to the BSC; and re-determines on-off states of logic carriers of corresponding cells according to corresponding cell performance measurement results of physical carriers of each RRU.

The step that the RRUs perform carrier controls according to the obtained on-off states of the physical carriers may include:

when being single-carrier RRUs, the RRUs power off carriers by turning off corresponding power amplifiers of the carriers, and power on carriers by turning on corresponding power amplifiers of the carriers.

The step that the RRUs perform carrier controls according to the obtained on-off states of the physical carriers may include:

when being multicarrier RRUs, the RRUs judge whether all the carriers of corresponding power amplifiers require to be powered off, if they require, the RRUs turn off the power amplifiers, otherwise, turn off powers of carriers requiring to be powered off, and judge whether remaining carriers requiring to be powered on are powered on again, if they are powered on again, the RRUs reset the powers of the carriers according to previously statically configured powers and regulate voltages of the power amplifiers; and if the RRUs are previously in a power amplifier closed state in which all the carriers are powered off, the power amplifiers are turned on again.

The on-off states of the physical carriers converted by the BBU may be included in response messages reported by the RRUs and then sent to corresponding RRUs.

A system for realizing a carrier control at least includes a RRU, a BBU and a Base Station Controller (BSC), wherein the RRU is configured to report on-off states of physical carriers to the BBU; and to receive on-off states of physical carriers from the BBU and perform a carrier control according to the obtained on-off states of the physical carriers;

the BBU is configured to receive on-off states of the physical carriers from the RRU, obtain and collect on-off state information of corresponding logic carriers of all configured cells according to logic physical relationships of carrier frequencies, then report the on-off states of the physical carriers and the logic physical relationships of the carrier frequencies to the BSC at the same time; and to receive on-off states of the logic carriers re-determined by the BSC from the BSC, convert the obtained on-off states of the logic carriers into on-off states of the physical carriers and then send them to the corresponding RRU; and the BSC is configured to receive on-off states of the current logic carriers and the logic physical relationships of the carrier frequencies from the BBU and re-determine the on-off states of the logic carriers and transmit them to the BBU.

The BBU may be further configured to compare the received on-off states of the physical carriers of the RRU with on-off states of the physical carriers stored by the BBU per se and recorded in an on-off state table of carriers of the RRU, and return the on-off states of the physical carriers of the RRU stored by the BBU per se to the RRU if they are different.

A first timer may be arranged in the RRU and the RRU may report the on-off states of the physical carriers to the BBU when the first timer times out; and a second timer may be arranged in the BBU, and the BBU may report the on-off states of the logical carriers and the logic physical relationships of the carrier frequencies to the BSC when the second timer times out.

It can be seen from the above-mentioned technical solution of the present disclosure that, a BBU obtains and collects on-off state information of corresponding logic carriers of all the configured cells and logic physical correspondence relationships of carriers according to on-off states of physical carriers regularly reported by a RRU and regularly reports them to a BSC; the BSC re-determines the on-off states of the logic carriers and returns them to the BBU; the BBU converts the obtained on-off states of the logic carriers into on-off states of physical carriers and sends them to the corresponding RRU in a response message regularly reported by the RRU; and the RRU performs a carrier control according to the obtained on-off states of the physical carriers. By the method provided in the present disclosure, the BSC ensures the consistence of carrier on-off states of both the BSC and the RRU by effectively controlling carrier on-off states on the RRU through the BBU, so that the carriers are well controlled and the target of saving energy and reducing consumption is better achieved.

DETAIL DESCRIPTION

Figure 1:
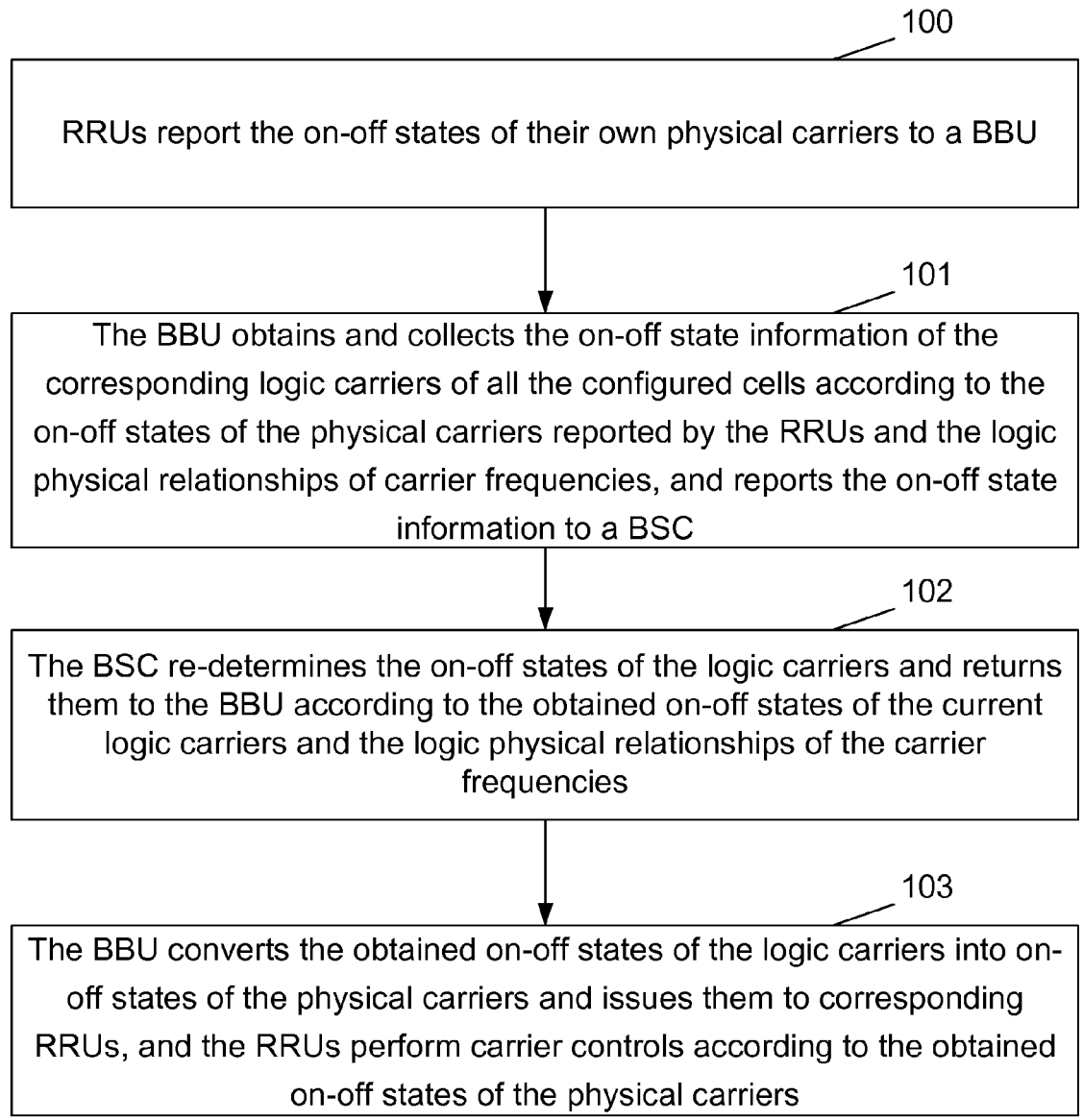
FIG. 1 is a flowchart of a method for realizing a carrier control in a BSS (a base station controller+an SDR base station)

FIG. 1 is a flowchart of a method for realizing a carrier control in a BSS (a base station controller+an SDR base station); as shown in FIG. 1, the method includes the following steps.

Step 100: RRUs report on-off states of their own current physical carriers to a BBU.

After the initial configuration or reconfiguration of carriers is completed, the RRUs set on-off states of their own physical carriers to default powered-on states, for example, a first timer is set according to system configuration, wherein the timing length of the first timer is determined by the system configuration. when the first timer times out, the RRUs report the on-off states of all their own physical carriers to the BBU.

Step 101: The BBU obtains and collects on-off state information of corresponding logic carriers of all the configured cells according to the on-off states of the physical carriers reported by the RRUs and logic physical relationships of carrier frequencies, and report the on-off state information to a Base Station Controller (BSC).

According to the on-off states of the physical carriers reported by the RRUs and the logic physical relationships of the carrier frequencies issued by a network manager, logic carrier frequencies corresponding to the physical carriers reported by the RRUs are found, and the on-off state information of the corresponding logic carriers of all the configured cells is collected; then, the on-off state information is reported to the BSC (for example, when a preset second timer times out), and the logic physical relationships of all the configured carrier frequencies of the BBU are also reported to the BSC. Here, the second timer is preset according to the system configuration, and the timing length of the second timer is determined by the system configuration.

Step 102: The BSC re-determines the on-off states of the logic carriers according to the obtained on-off states of the current logic carriers and the logic physical relationships of carrier frequencies and returns them to the BBU.

The BSC obtains the on-off states of physical logics of each RRU according to the obtained on-off states of the current logic carriers and the logic physical relationships of the carrier frequencies; and the BSC re-determines on-off states of logic carriers of corresponding cells according to corresponding cell performance measurement results of physical carrier frequencies of each RRU and returns them to the BBU. In this step, the specific implementation of re-determining on-off states of logic carriers belongs to the prior art, thereby needing no further description here.

By this step, the BSC not only obtains the on-off states of the logic carriers of all the logic cells of the BBU, but also knows the on-off states of the current physical logics of each RRU, thereby facilitating controlling carrier frequencies.

Step 103: The BBU converts the obtained on-off states of the logic carriers to on-off states of the physical carriers and sends them to corresponding RRUs, and the RRUs perform carrier controls according to the obtained on-off states of the physical carriers.

The BBU correspondingly converts (or maps) the on-off states of the logic carriers issued by the BSC to the on-off states of physical carriers according to the logic physical relationships of the carrier frequencies issued by the network manager, and stores the on-off states of the physical carriers by taking a RRU as a unit. The RRUs perform carrier controls according to the on-off states of the physical carriers issued by the BBU, such as turning off power amplifiers or regulating the voltages of the power amplifiers.

In terms of energy saving and consumption reduction, the BSC does not have a high requirement on the real-time of the on-off of carrier frequencies, and the time granularity for turning off the carrier frequencies is always at hour level. Therefore, in this application, the on-off synchronization time of the carrier frequencies of the BSC and the BBU, i.e., the timing length of the second timer, can be set to be at minute level; while the synchronization time of the BBU and the RRU, i.e., the timing length of the first timer, can be set to multiple of ten seconds. At the same time, this application adopts a synchronization mechanism from bottom to top, i.e., from the RRUs to the BBU and then to the BSC, to ensure the synchronization efficiency as well as the simplicity of the process.

By the method of the present disclosure, the BSC not only obtains the on-off states of the logic carries of all the logic cells of the BBU, but also knows the on-off states of the current physical logics of each RRU and ensures the consistence between the BSC and the on-off states of the carriers of the RRUs, so that carriers are well controlled and the target of saving energy and reducing consumption is better achieved.

Further, after the RRUs regularly report the on-off states of their own current physical carriers to the BBU, the method further includes: the BBU obtains and collects on-off state information of corresponding logic carriers of all the configured cells according to the on-off states of the physical carriers reported by the RRUs; specifically, the BBU receives on-off states of physical carriers of a certain RRU, and then compares the states with on-off states of the physical carriers stored by the BBU per se and recorded in an on-off state table of carriers of the RRU, and returns the on-off states of the physical carriers of the RRU stored by the BBU per se to the RRU if they are different. And, the RRU perform carrier on-off reconfiguration according to the received on-off states of the physical carriers returned by the BBU. Here, the on-off state table of carriers of the RRU stored by the BBU per se refers to the on-off states of the physical carrier frequencies converted by the BBU according to the on-off states of logic carriers previously adjusted and notified by the BSC.

Figure 2:
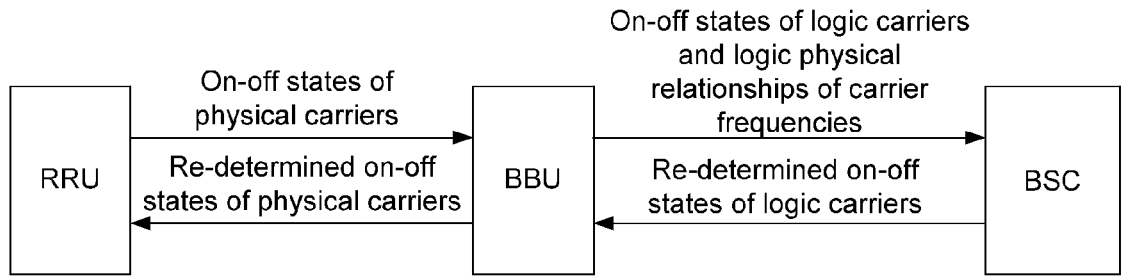
FIG. 2 is a diagram showing the composition and structure of a system for realizing a carrier control in a BSS (a base station controller+an SDR base station)

Corresponding to the method of the present disclosure, a system for realizing a carrier control in an SDR base station is further provided, and FIG. 2 is a diagram showing the composition and structure of a system for realizing a carrier control in an SDR base station; as shown in FIG. 2, the system at least includes a RRU, a BBU and a BSC, wherein, the RRU is configured to regularly report on-off states of its own current physical carriers to the BBU; and to receive on-off states of physical carriers from the BBU and perform a carrier control according to the obtained on-off states of the physical carriers;

the BBU is configured to receive the on-off states of the physical carriers from the RRU, obtain and collect on-off state information of corresponding logic carriers of all configured cells, and regularly report the on-off state information and logic physical relationships of carrier frequencies to the BSC at the same time; and to receive on-off states of the logic carriers re-determined by the BSC, convert the obtained on-off states of the logic carriers into on-off states of physical carriers and then send them to the corresponding RRU; and the BSC is configured to receive on-off states of current logic carriers from the BBU, re-determine on-off states of the logic carriers and transmit them to the BBU.

The BBU is further configured to compare the received on-off states of the physical carriers of the RRU with on-off states of physical carriers stored by the BBU per se and recorded in an on-off state table of carriers of the RRU, and return the on-off states of the physical carriers of the RRU stored by the BBU per se to the RRU if they are different.

The RRU is further configured to receive the on-off states of the physical carriers returned by the BBU and perform on-off reconfiguration on the carriers.

The method will be described in detail in combination with embodiments.

Figure 3:
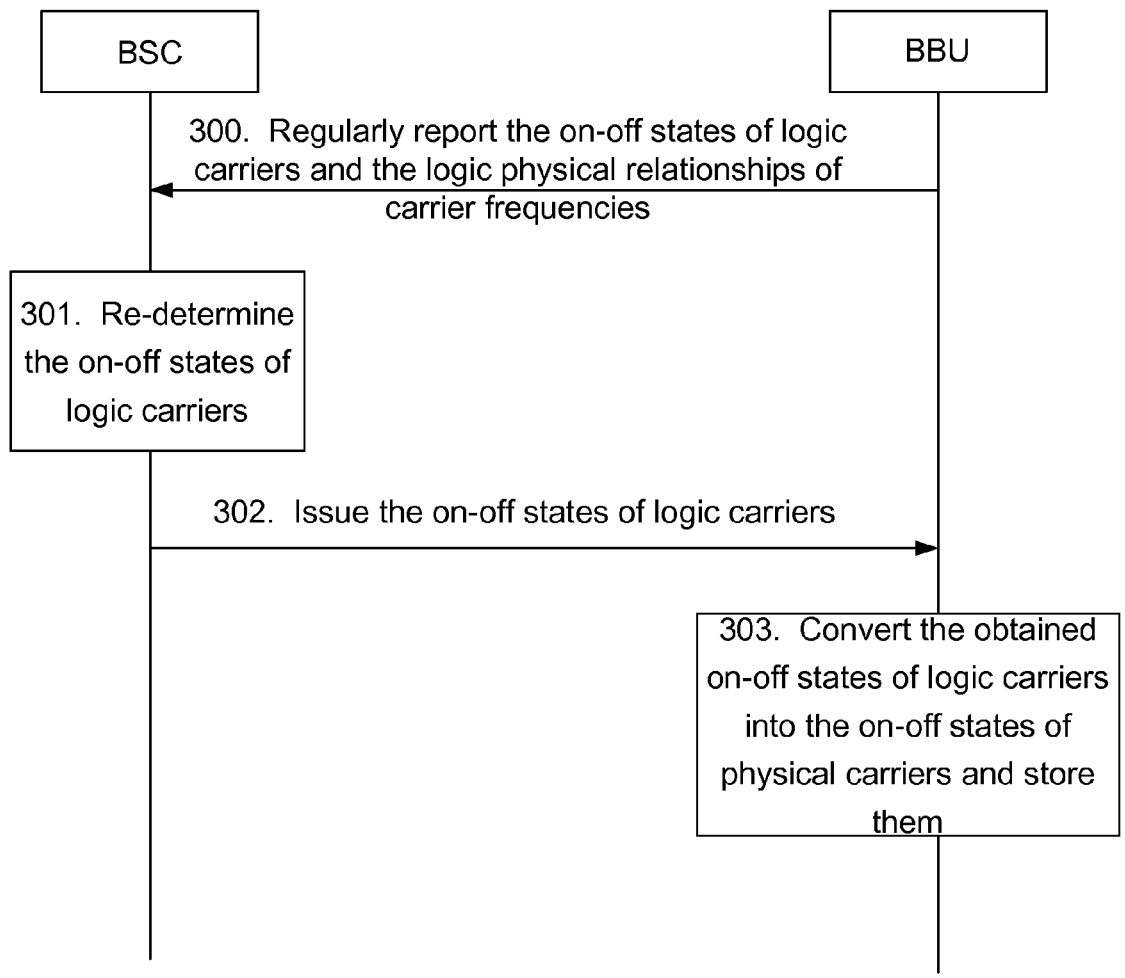
FIG. 3 is a flowchart showing the synchronization of on-off states of logic carrier frequencies of a base station controller and a BBU in the present disclosure.

FIG. 3 is a flowchart showing the synchronization of the on-off states of the logic carriers of a BBU and a BSC in the present disclosure; as shown in FIG. 3, the specific implementation of Step 101 to Step 102 in FIG. 1 is shown, including the following steps.

Step 300: the BBU regularly reports on-off states of logic carriers and logic physical relationships of carrier frequencies to the BSC.

In this step, after completing initial configuration of parameters of the BBU (or reconfiguration of parameters of carrier frequencies whose physical logic binding relationships are changed), the BBU sets on-off states of physical carriers in the on-off state table of carriers of the RRU connected with the BBU to default powerd-on states, and sets the second timer according to the system configuration.

When the second timer times out, according to logic physical relationships of carrier frequencies issued by a network manager, on-off states of physical carriers are mapped (or converted) into on-off states of logic carriers, and the on-off states of the logic carriers together with the logic physical relationships of carrier frequencies compose an Abis interface message, which is then transmitted to the BSC. The Abis interface is an interface between the BBU and the BSC, being an existing interface; and the use of the Abis interface belongs to common technical means for those skilled in the art, thereby needing not further description.

Step 301: The BSC re-determines on-off states of the logic carriers.

The BSC obtains on-off states of physical logics of each RRU according to the logic physical relationships of the carrier frequencies reported by the BBU and the on-off states of the logic carriers, and re-determines on-off states of logic carriers of corresponding cells according to corresponding cell performance measurement results of physical carrier frequencies of each RRU.

The BSC may determine the on-off states of the logic carriers according to the cell performance measurement results by adopting the following two methods, and which method to be specifically adopted can be determined by a switch of a remote-end operation maintenance network manager.

One method is to judge whether a preset average telephone traffic of each line in a measurement period reaches a preset on-off threshold; in this method, the BSC scans performance data, and takes performance statistics of each cell and calculates the average telephone traffic of each line when the measurement period falls due; if the telephone traffic of each line reaches the on-off threshold, a carrier frequency is selected to be powered on/off according to a preset on-off criterion.

The other method is to judge whether a telephone traffic peak in a measurement period reaches an on-off threshold; in this method, the telephone traffic peak is counted at first, the ratio of occupied channels to available channels is counted every time when the channels are occupied or released, and the highest ratio in the measurement period is recorded as the telephone traffic peak. When the preset measurement period falls due every time, whether the telephone traffic peak has reached the on-off threshold is judged, if it has reached the on-off threshold, a carrier frequency is selected to be powered on/off according to a preset on-off criterion.

The preset on-off criterion includes but is not limited to: if a carrier frequency of a multicarrier RRU has been powered off, then other carrier frequencies of the multicarrier RRU is considered preferably to be powered on/off; or, all the carrier frequencies of a cell are traversed, the first carrier frequency having no Broadcast Control Channel (BCCH), Stand-Along Dedicated Control Channel (SDCCH) and Packet Broadcast Control Channel (PBCCH) is selected to be powered off; or, after the selected carrier frequency is powered off, there must be a Traffic Channel (TCH), a Packet Data Control Channel (PDCCH) and the like in the cell.

Step 302: The BSC issues the on-off states of the logic carriers to the BBU.

The BSC can issue the re-determined on-off states of the logic carriers to the BBU in a response message which is to be sent to the BBU, in order to require the base station to perform on-off reconfiguration of the carrier frequencies.

Step 303: The BBU converts the obtained on-off states of the logic carriers to on-off states of the physical carriers.

The BBU finds on-off states of the physical carriers correspondingly converted from the on-off states of the logic carriers issued by the BSC according to the logic physical relationships of the carrier frequencies issued by the network manager, and stores the on-off states of the physical carriers in its own on-off state table of carriers of a RRU by taking a RRU as a unit.

Figure 4:
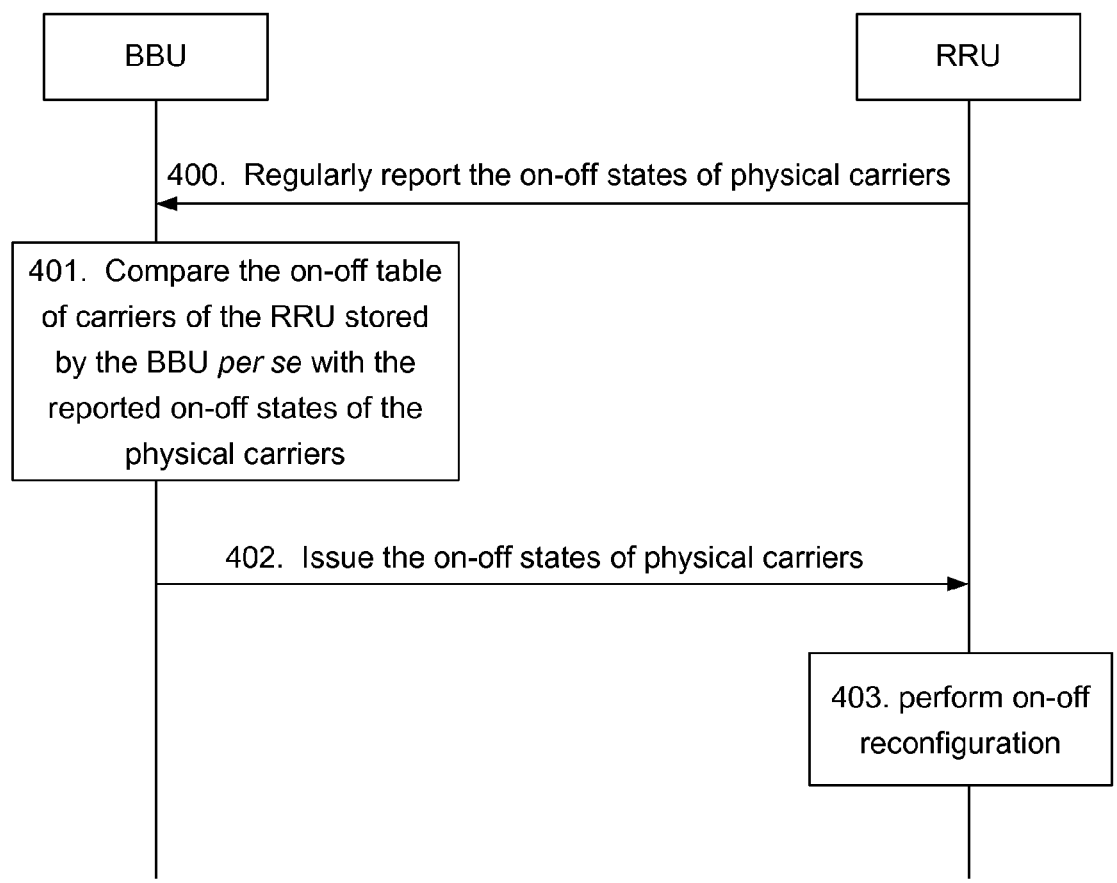
FIG. 4 is a flowchart showing the synchronization of on-off states of physical carrier frequencies of a BBU and a RRU in the present disclosure.

In this application, the on-off synchronization time of the carrier frequencies of the BSC and the BBU, i.e., the timing length of the second timer, can be set to be at minute level, while the synchronization time of the BBU and the RRU, i.e., the timing length of the first timer, can be set to 10s of seconds, therefore there is an on-off synchronization process between the RRU and the BBU. FIG. 4 is a flowchart showing the on-off synchronization of physical carrier frequencies of a RRU and a BBU; as shown in FIG. 4, the flow comprises:

Step 400: RRUs regularly report on-off states of their own current physical carriers to a BBU;

Step 401~402: the BBU obtains and collects on-off state information of corresponding logic carriers of all the configured cells according to the on-off states of the physical carriers reported by the RRUs;

in this step, the BBU compares received on-off states of physical carriers of a certain RRU with on-off states of the physical carriers stored by the BBU per se and recorded in an on-off state table of carriers of the RRU, and returns the on-off states of the physical carriers of the RRU stored by the BBU per se to the RRU if they are different; and Step 403: the RRUs perform carrier on-off reconfiguration after receiving the on-off states of the physical carriers returned by the BBU.

Figure 5:
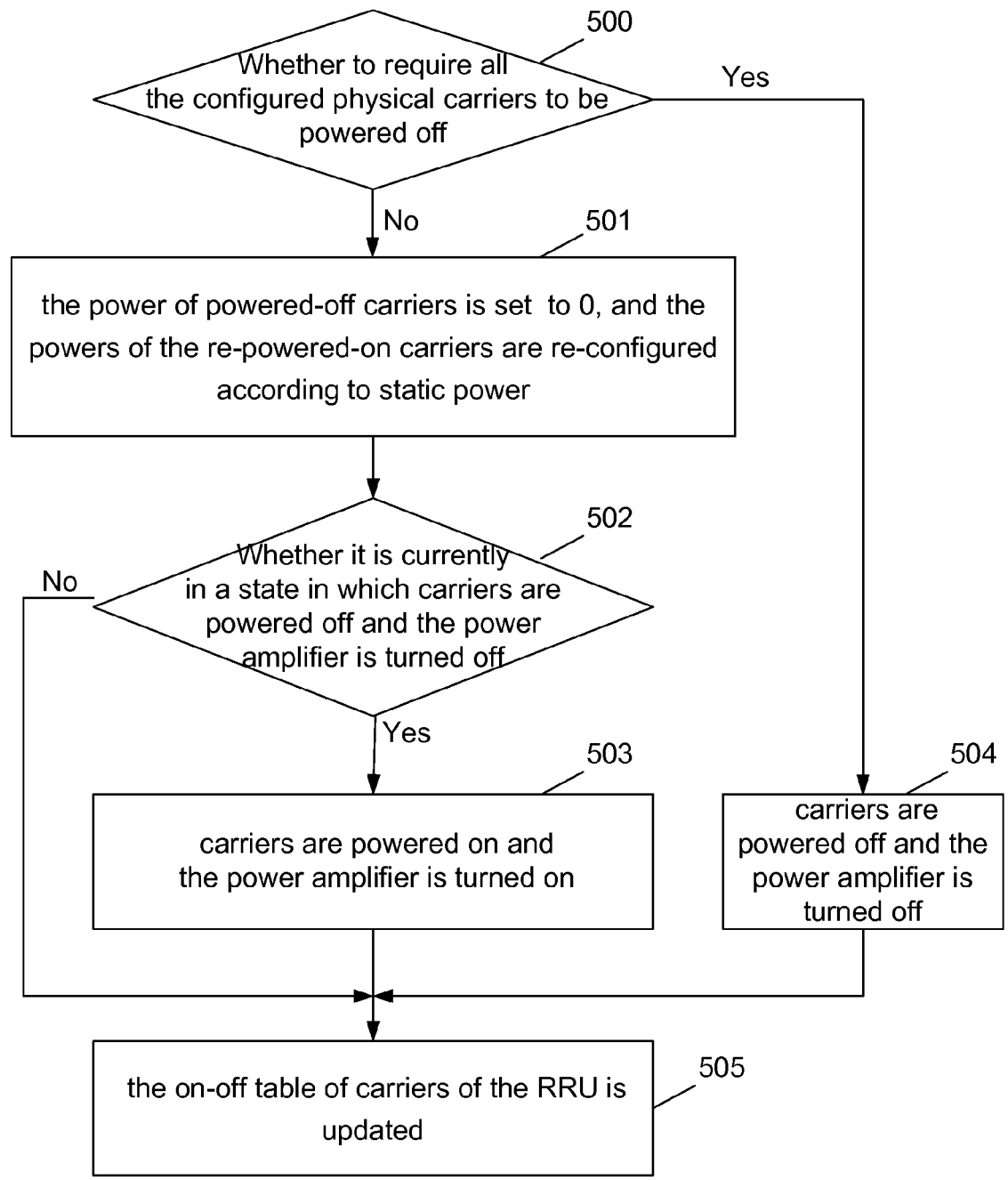
FIG. 5 is a flowchart showing the process of performing on-off configuration at a RRU in the present disclosure.

FIG. 5 is a flowchart showing a process of performing on-off configuration by a RRU; as shown in FIG. 5, the flow comprises:

Step 500: judging whether on-off states of physical carriers returned by the BBU require all the configured physical carriers to be powered off, if they require to be powered off, executing Step 504; otherwise, executing Step 501;

Step 501: setting the powers of carriers requiring to be powered off to 0, and re-configuring the powers of re-powered-on carriers according to a corresponding static carrier power;

Step 502: judging whether the RRU is in a power amplifier closed state in which carriers are powered off, if the RRU is in this state, executing Step 503; otherwise, executing Step 505;

Step 503: powering on the carriers and turning on the power amplifier; then, executing Step 505;

Step 504: powering off the carriers and turning off the power amplifier; and

Step 505: updating the on-off states of the carriers of the RRU according to the on-off condition.

The specific implementation of the on-off in FIG. 5 comprises: for a single-carrier RRU, i.e., one carrier singly uses a set of radio frequency channels (containing one power amplifier), the RRU powers off the carrier by turning off the corresponding power amplifier of the carrier, and powers on the carrier by turning on the corresponding power amplifier of the carrier.

For a multicarrier RRU, i.e., multiple carriers share a set of radio frequency channels (containing one power amplifier), the RRU firstly judges whether all the carriers of the corresponding power amplifier require to be powered off, if they require to be powered off, the power amplifier is directly turned off; otherwise, the powers of the carriers requiring to be powered off are powered off; the powers of the re-powered-on carriers are reset according to previously statically configured power and a power amplifier bias is regulated; if the corresponding power amplifier of the carriers requiring to be powered on is previously in a power amplifier closed state in which all the carriers are powered off, then the power amplifier is turned on again.

The above are only preferred embodiments of the present disclosure, and are not used for limiting the scope of protection of the present disclosure; any modifications, equivalent substitutes, improvements and the like within the spirit and principle of the present disclosure shall fall within the scope of protection of the present disclosure.

The invention claimed is:
1. A method for realizing a carrier control, comprising:
reporting on-off states of physical carriers to a Base Band Unit (BBU) by Radio Remote Units (RRU);
obtaining and collecting on-off state information of corresponding logic carriers of all configured cells by the BBU according to the on-off states of the physical carriers reported by the RRUs and logic physical relationships of carrier frequencies, and reporting the on-off state information to a Base Station Controller (BSC) by the BBU;
re-determining on-off states of the logic carriers by the BSC according to the obtained on-off states of the cur- rent logic carriers and the logic physical relationships of the carrier frequencies and returning them to the BBU by the BSC; and converting the obtained on-off states of the logic carriers into on-off states of the physical carriers and sending them to corresponding RRUs by the BBU, and performing carrier controls by the RRUs according to the obtained on-off states of the physical carriers.

2. The method according to claim 1, wherein when a preset first timer times out, the RRUs regularly report the on-off states of the physical carriers to the BBU; and when a preset second timer times out, the BBU regularly reports the on-off state information of the logic carriers and the logic physical relationships of the carrier frequencies to the BSC.

3. The method according to claim 2, further comprising after the RRUs regularly report the on-off states of the physical carriers to the BBU:

after receiving on-off states of physical carriers of a certain RRU, comparing by the BBU the received on-off states with on-off states of the physical carriers stored by the BBU per se and recorded in an on-off state table of carriers of the RRU, and returning by the BBU the on-off states of the physical carriers of the RRU stored by the BBU per se to the RRU if the received on-off states and the stored on-off states are different; and performing, by the RRUs, on-off reconfiguration on carriers according to the on-off states of the physical carriers returned by the BBU.

4. The method according to claim 2, wherein the obtaining and collecting on-off state information of corresponding logic carriers of all configured cells by the BBU comprises:

the BBU searches for logic carrier frequencies corresponding to the physical carrier frequencies reported by the RRUs according to the on-off states of the physical carriers reported by the RRUs and the logic physical relationships of the carrier frequencies issued by a network manager, and collects the on-off state information of the corresponding logic carriers of all the configured cells.

5. The method according to claim 2, wherein the BBU further transmits the logic physical relationships of the carrier frequencies issued by the network manager to the BSC; and the re-determining on-off states of the logic carriers by the BSC comprises:

the BSC obtains on-off states of physical carrier frequencies of each RRU according to the obtained on-off states of the current logic carriers and the logic physical relationships of the carrier frequencies transmitted from the BBU to the BSC; and re-determines on-off states of logic carriers of corresponding cells according to corresponding cell performance measurement results of physical carriers of each RRU.

6. The method according to claim 2, wherein the performing carrier controls by the RRUs according to the obtained on-off states of the physical carriers comprises:

when being single-carrier RRUs, the RRUs power off carriers by turning off corresponding power amplifiers of the carriers, and power on carriers by turning on corresponding power amplifiers of the carriers.

7. The method according to claim 2, wherein the performing carrier controls by the RRUs according to the obtained on-off states of the physical carriers comprises:

when being multicarrier RRUs, the RRUs judge whether all the carriers of corresponding power amplifiers require to be powered off, if they require to be powered off, then the RRUs turn off the power amplifiers, otherwise, the RRUs turn off powers of carriers requiring to be powered off, and judge whether remaining carriers requiring to be powered on are powered on again, if they are powered on again, the RRUs reset the powers of the carriers according to previously statically configured powers and regulate voltages of the power amplifiers; and if the RRUs are previously in a power amplifier closed state in which all the carriers are powered off, the power amplifiers are powered on again.

8. The method according to claim 1, wherein the on-off states of the physical carriers converted by the BBU are included in response messages reported by the RRUs and then sent to corresponding RRUs.

9. A system for realizing a carrier control, at least comprising a Radio Remote Unit (RRU), a Base Band Unit (BBU) and a Base Station Controller (BSC), wherein the RRU is configured to report on-off states of physical carriers to the BBU; and to receive on-off states of physical carriers from the BBU and perform a carrier control according to the obtained on-off state of the physical carrier;

the BBU is configured to receive the on-off states of the physical carriers from the RRU, obtain and collect on-off state information of corresponding logic carriers of all configured cells according to logic physical relationships of carrier frequencies, then report the on-off states of the physical carriers and the logic physical relationships of the carrier frequencies to the BSC at the same time; and to receive on-off states of the logic carriers re-determined by the BSC from the BSC, convert the obtained on-off states of the logic carriers into on-off states of physical carriers and then send them to the corresponding RRU; and the BSC is configured to receive on-off states of current logic carriers and the logic physical relationships of the carrier frequencies from the BBU and re-determine the on-off states of the logic carriers and transmit them to the BBU.

10. The system according to claim 9, wherein the BBU is further configured to compare the received on-off states of the physical carriers of the RRU with on-off states of the physical carriers stored by the BBU per se and recorded in an on-off state table of carriers of the RRU, and return the on-off states of the physical carriers of the RRU stored by the BBU per se to the RRU if they are different.

11. The system according to claim 9, wherein a first timer is arranged in the RRU and the RRU reports the on-off states of the physical carriers to the BBU when the first timer times out; and a second timer is arranged in the BBU, and the BBU reports the on-off states of the logical carriers and the logic physical relationships of the carrier frequencies to the BSC when the second timer times out.

12. The method according to claim 3, wherein the obtaining and collecting on-off state information of corresponding logic carriers of all configured cells by the BBU comprises:

the BBU searches for logic carrier frequencies corresponding to the physical carrier frequencies reported by the RRUs according to the on-off states of the physical carriers reported by the RRUs and the logic physical relationships of the carrier frequencies issued by a network manager and collects the on-off state information of the corresponding logic carriers of all the configured cells.

13. The method according to claim 3, wherein the BBU further transmits the logic physical relationships of the carrier frequencies issued by the network manager to the BSC; and
the re-determining on-off states of the logic carriers by the BSC comprises:
the BSC obtains on-off states of physical carrier frequencies of each RRU according to the obtained on-off states of the current logic carriers and the logic physical relationships of the carrier frequencies transmitted from the BBU to the BSC; and re-determines on-off states of logic carriers of corresponding cells according to corresponding cell performance measurement results of physical carriers of each RRU.

14. The method according to claim 3, wherein the performing carrier controls by the RRUs according to the obtained on-off states of the physical carriers comprises:
when being single-carrier RRUs, the RRUs power off carriers by turning off corresponding power amplifiers of the carriers, and power on carriers by turning on corresponding power amplifiers of the carriers.

15. The method according to claim 3, wherein the performing carrier controls by the RRUs according to the obtained on-off states of the physical carriers comprises:
when being multicarrier RRUs, the RRUs judge whether all the carriers of corresponding power amplifiers require to be powered off, if they require to be powered off, then the RRUs turn off the power amplifiers, otherwise, the RRUs turn off powers of carriers requiring to be powered off, and judge whether remaining carriers requiring to be powered on are powered on again, if they are powered on again, the RRUs reset the powers of the carriers according to previously statically configured powers and regulate voltages of the power amplifiers; and if the RRUs are previously in a power amplifier closed state in which all the carriers are powered off, the power amplifiers are powered on again.

16. The method according to claim 2, wherein the on-off states of the physical carriers converted by the BBU are included in response messages reported by the RRUs and then sent to corresponding RRUs.

17. The method according to claim 3, wherein the on-off states of the physical carriers converted by the BBU are included in response messages reported by the RRUs and then sent to corresponding RRUs.

18. The system according to claim 10, wherein a first timer is arranged in the RRU and the RRU reports the on-off states of the physical carriers to the BBU when the first timer times out; and
a second timer is arranged in the BBU, and the BBU reports the on-off states of the logical carriers and the logic physical relationships of the carrier frequencies to the BSC when the second timer times out.

* * * * *